United States Patent
Gulyas et al.

(10) Patent No.: US 11,702,436 B2
(45) Date of Patent: Jul. 18, 2023

(54) TETRAPHENYLPHENOXY TUNGSTEN OXO ALKYLIDENE COMPLEXES AND METHODS OF MAKING SAME AND USE THEREOF

(71) Applicant: Verbio Vereinigte BioEnergie AG, Zörbig (DE)

(72) Inventors: Henrik Gulyas, Budapest (HU); Benedek Vakulya, Budapest (HU)

(73) Assignee: Verbio Vereinigte BioEnergie AG, Zörbig (DE)

( * ) Notice: Subject to any disclaimer, the term of this patent is extended or adjusted under 35 U.S.C. 154(b) by 165 days.

(21) Appl. No.: 16/982,479

(22) PCT Filed: Mar. 22, 2019

(86) PCT No.: PCT/EP2019/057285
§ 371 (c)(1),
(2) Date: Sep. 18, 2020

(87) PCT Pub. No.: WO2019/180230
PCT Pub. Date: Sep. 26, 2019

(65) Prior Publication Data
US 2021/0017207 A1    Jan. 21, 2021

(30) Foreign Application Priority Data
Mar. 22, 2018 (EP) .................... 18163350

(51) Int. Cl.
*C07F 11/00* (2006.01)
*C08F 4/69* (2006.01)

(52) U.S. Cl.
CPC .......... *C07F 11/00* (2013.01); *C08F 4/69068* (2013.01)

(58) Field of Classification Search
CPC ............................. C07F 11/00; C08F 4/69068
See application file for complete search history.

(56) References Cited

U.S. PATENT DOCUMENTS

| | | | |
|---|---|---|---|
| 2013/0116434 A1 | 5/2013 | Schrock et al. | |
| 2015/0240008 A1 | 8/2015 | Schrock et al. | |
| 2016/0368888 A1 | 12/2016 | Davey et al. | |

FOREIGN PATENT DOCUMENTS

| | | | |
|---|---|---|---|
| JP | 2016510070 | 4/2016 | |
| WO | 2013070725 | 5/2013 | |
| WO | 2015155593 | 10/2015 | |
| WO | 2016143911 | 9/2016 | |
| WO | WO-2016143911 A1 * | 9/2016 | .............. B01J 31/20 |
| WO | 2017087710 | 5/2017 | |
| WO | WO-2019181124 A1 * | 9/2019 | |

OTHER PUBLICATIONS

English translation of the description of WIPO Publication 2019181124-A1. (Year: 2022).*
International Preliminary Report dated Oct. 1, 2020 for PCT/EP2019/057285.
Forrest, et al.,Tungsten Oxo Alkylidene Complexes as Initiators for the Stereoregular Polymerization of 2,3-Dicarbomethoxynorbornadiene, Organometallics, vol. 33 No. 9 ,May 12, 2014 ,2313-2325.
International Search Report dated May 2, 2019 for PCT/EP2019/057285.
Antenvieth, et al.Stereospecific Ring-Opening Metathesis polymerization (ROMP) of Endo-Dicyclopentadiene by Molybdenum and Tungsten Catalysts, Macromolecules 48 ,2015 ,2480-2492.
Benedikter, et al.,Regio- and Stereoselective Ring-Opening Metathesis Polymerization of Enantiomerically Pure Vince Lactam, Macromolecules 51 ,2018 ,2276-2282.
Forrest, et al.,Tungsten OXO Alkylidene Complexes as Initators for the Stereoregular Polymerization of 2,3-Dicarbomethoxynorbornadiene, Organometallics 33 ,2014 ,2313-2325.
Sues, et al.,Molybdenum and Tungsten Alkylidene Complexes that Contain a Z-Pyridyl-Substituted Phenoxide Ligand, Organometallics 35 ,2016 ,3587-3593.

* cited by examiner

*Primary Examiner* — Joseph R Kosack
*Assistant Examiner* — Sagar Patel
(74) *Attorney, Agent, or Firm* — Dorsey & Whitney LLP

(57) ABSTRACT

The invention relates to tungsten oxo alkylidene complexes ligated with a tetraphenylphenoxy ligand and a neutral ligand such as a phosphine or a pyridine, and method of making the complexes. The complexes are useful as catalysts for performing a ring-opening metathesis polymerization of dicyclopentadiene to poly(dicyclopentadiene).

15 Claims, No Drawings

TETRAPHENYLPHENOXY TUNGSTEN OXO ALKYLIDENE COMPLEXES AND METHODS OF MAKING SAME AND USE THEREOF

RELATED APPLICATIONS

This patent application is the U.S. National Stage filing under 35 U.S.C. 371 of International Patent Application No. PCT/EP2019/057285 entitled "TETRAPHENYLPHENOXY TUNGSTEN OXO ALKYLIDENE COMPLEXES, METHODS OF MAKING SAME AND USE THEREOF," filed Mar. 22, 2019, which claims priority to EP 18163350.4, filed Mar. 22, 2018, each of which is incorporated herein by reference in its entirety.

FIELD OF THE INVENTION

The invention relates to tungsten oxo alkylidene complexes ligated with an optionally substituted 2,3,5,6-tetraphenylphenoxy ligand. The complexes may bear a neutral ligand such as a phosphine or a pyridine. The complexes are useful as catalysts for performing a ring-opening metathesis polymerization (ROMP) of dicyclopentadiene (DCPD) to poly(dicyclopentadiene) (PDCPD).

BACKGROUND OF THE INVENTION

Hydrogenated poly(dicyclopentadiene) (HPDCPD) is attracting interest as material that may be used e.g. in optical applications and various other applications due to excelling properties in terms of transparency, low birefringence, shaping processability, etc. It may be made by hydrogenation of PDCPD which in turn may be made by ROMP of endo-DCPD using suitable catalysts.

WO 2015/127192 discloses ROMP of DCPD using tungsten oxo terphenolate complexes as catalysts. Catalysis with tungsten oxo terphenolate complex

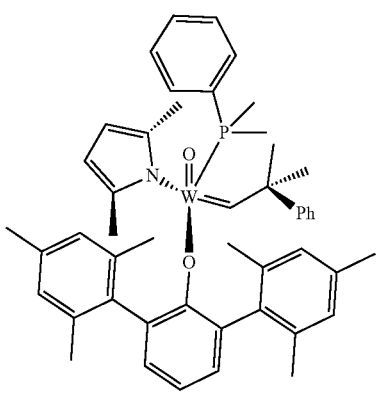

results in a PDCPD having 100% cis configuration and 100% syndiotacticity.

Autenrieth, B. et al: "Stereospecific Ring-Opening Metathesis Polymerization (ROMP) of endo-Dicyclopentadiene by Molybdenum and Tungsten Catalysts", Macromolecules 2015, 48, 2480-2492, disclose ROMP of DCPD using a variety of catalysts.

Besides imido molybdenum and tungsten alkylidene complexes or bisaryloxy tungsten oxo alkylidene complexes, 2,3,5,6-tetraphenylphenoxy tungsten oxo alkylidene complex

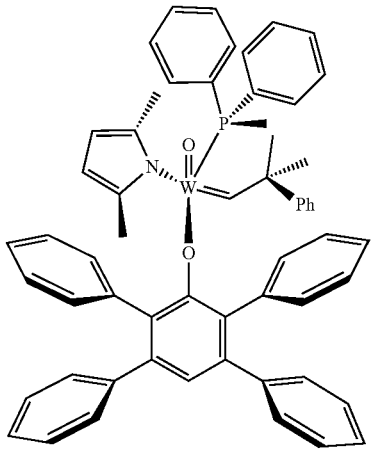

has been proved as effective catalyst: 50 to 200 equivalents of DCPD per equivalent catalyst result in a PDCPD having >98% cis configuration and >98% syndiotacticity.

OBJECTS OF THE INVENTION

For industrial application of ROMP of DCPD, catalysts are required which may be easily prepared and which are stable under the reaction conditions as long as possible. It would be further advantageous if the catalytic activity of such catalysts might be adjusted to various reaction conditions, respectively wherein the catalytic activity might be adjusted such that a tailor-made PDCPD may be prepared, e.g. in terms of melting point, molecular weight, molecular weight distribution, stereoselectivity and tacticity, which in turn allows after hydrogenation the formation of a HPDCPD having desired application properties. It was the object of the invention to provide such catalysts, e.g. in the form of a catalyst library.

SUMMARY OF THE INVENTION

This object has been achieved with a tungsten oxo alkylidene complex ligated with a substituted 2,3,5,6-tetraphenylphenoxy ligand as defined in claim 1.

In an alternative, this object has been achieved with a tungsten oxo alkylidene complex ligated with 2,3,5,6-tetraphenylphenoxy ligand as defined in claim 2.

The catalysts defined therein have a good stability under reaction conditions which are commonly used for the ROMP of endo-DCPD.

Since the 2,3,5,6-tetraphenylphenoxy ligand may be substituted with various electron withdrawing or electron donating substituents, either in the 4-position or in one or more of the phenyl substituents in 2,3,5, and 6-position, or in 4-position and in one or more of the phenyl substituents in 2,3,5, and 6-position, the catalytic activity of the catalysts may be advantageously adapted such to allow the subsequent formation of a tailor-made PDCPD, and thus of a tailor-made HPDCPD.

Moreover, the inventors of the present invention discovered that in particular the compounds defined in claim 1 allow in ROMP of DCPD for an excellent controllability of the molecular weight of the PDCPD. Also the addition of a chain transfer agent such as a 1-olefin such as 1-hexene does not decrease the stereospecificity of the polymerizations. This is of particular advantage.

DETAILED DESCRIPTION OF THE INVENTION

Compounds according to the invention useful in ROMP of endo-DCPD

In a first aspect, the invention relates to a compound of formula I:

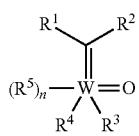

I wherein:
each of $R^1$ and $R^2$ is independently —R, —OR, —SR, —N(R)$_2$, —OC(O)R, —S(O)R, —SO$_2$R, —SO$_2$N(R)$_2$, —C(O)N(R)$_2$, —NRC(O)R, or —NRSO$_2$R; wherein each R is independently hydrogen or an optionally substituted group selected from $C_{1-10}$ aliphatic, $C_{1-10}$ heteroalkyl having 1-3 heteroatoms independently selected from nitrogen, oxygen or sulfur, phenyl, a 3-7 membered saturated or partially unsaturated carbocyclic ring, a 6-10 membered bicyclic saturated, partially unsaturated or aryl ring, a 5-6 membered monocyclic heteroaryl ring having 1-4 heteroatoms independently selected from nitrogen, oxygen or sulfur, a 3-7 membered saturated or partially unsaturated heterocyclic ring having 1-3 heteroatoms independently selected from nitrogen, oxygen or sulfur, a 7-10 membered bicyclic saturated or partially unsaturated heterocyclic ring having 1-5 heteroatoms independently selected from nitrogen, oxygen or sulfur, or an 8-10 membered bicyclic heteroaryl ring having 1-5 heteroatoms independently selected from nitrogen, oxygen or sulfur; or:
two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen or sulfur;
$R^3$ is optionally substituted 5-14 membered heteroaryl having 1-4 heteroatoms independently selected from nitrogen, oxygen or sulfur, wherein at least one heteroatom is nitrogen; and wherein said heteroaryl ring is coordinated to W via said nitrogen atom;
$R^4$ is —OAr; wherein
Ar is 2,3,5,6-tetraphenylphenyl bearing in 4-position a substituent which is different from hydrogen; or
Ar is 2,3,5,6-tetraphenylphenyl bearing in 4-position a substituent which is different from hydrogen, and wherein one or more of the phenyl substituents in 2, 3, 5, or 6 position is/are substituted;
n is 0, 1 or 2; and
each $R^5$ is independently a phosphorus-containing ligand, wherein the phosphorus-containing ligand is bonded to W through a phosphorus atom.

In a second aspect, the invention relates to a compound of formula II:

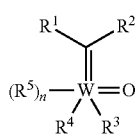

II wherein:
each of $R^1$ and $R^2$ is independently —R, —OR, —SR, —N(R)$_2$, —OC(O)R, —S(O)R, —SO$_2$R, —SO$_2$N(R)$_2$, —C(O)N(R)$_2$, —NRC(O)R, or —NRSO$_2$R; wherein each R is independently hydrogen or an optionally substituted group selected from $C_{1-10}$ aliphatic, $C_{1-10}$ heteroalkyl having 1-3 heteroatoms independently selected from nitrogen, oxygen or sulfur, phenyl, a 3-7 membered saturated or partially unsaturated carbocyclic ring, a 6-10 membered bicyclic saturated, partially unsaturated or aryl ring, a 5-6 membered monocyclic heteroaryl ring having 1-4 heteroatoms independently selected from nitrogen, oxygen or sulfur, a 3-7 membered saturated or partially unsaturated heterocyclic ring having 1-3 heteroatoms independently selected from nitrogen, oxygen or sulfur, a 7-10 membered bicyclic saturated or partially unsaturated heterocyclic ring having 1-5 heteroatoms independently selected from nitrogen, oxygen or sulfur, or an 8-10 membered bicyclic heteroaryl ring having 1-5 heteroatoms independently selected from nitrogen, oxygen or sulfur; or:
two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen or sulfur;
$R^3$ is optionally substituted 5-14 membered heteroaryl having 1-4 heteroatoms independently selected from nitrogen, oxygen or sulfur, wherein at least one heteroatom is nitrogen; and wherein said heteroaryl ring is coordinated to W via said nitrogen atom;
$R^4$ is —OAr; wherein
Ar is 2,3,5,6-tetraphenylphenyl; or
Ar is 2,3,5,6-tetraphenylphenyl, and wherein one or more of the phenyl substituents in 2, 3, 5, or 6 position is/are substituted;
n is 0, 1 or 2; and
each $R^5$ is independently a phosphorus-containing ligand, wherein the phosphorus-containing ligand is bonded to W through a phosphorus atom; and
wherein a compound of formula

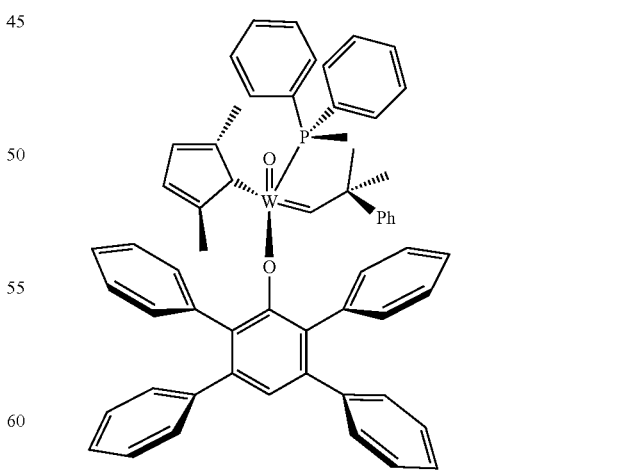

is excluded.

In one embodiment of the first aspect or the second aspect, one of $R^1$ and $R^2$ is hydrogen and the other is an optionally substituted group selected from $C_{1-10}$ aliphatic.

In one embodiment, one of $R^1$ and $R^2$ is hydrogen and the other is selected from $C(CH_3)_3$, $C(CH_3)_2C_6H_5$, or phenyl.

In one embodiment, said phenyl bears in 2-position a residue —O—$R^6$, wherein $R^6$ is selected from $C_{1-6}$ alkyl.

In one embodiment, $R^3$ is selected from optionally substituted pyrrol-1-yl.

In one embodiment, $R^3$ is selected from pyrrol-1-yl, 2,5-dimethylpyrrol-1-yl, or 2,5-diphenylpyrrol-1-yl, or indol-1-yl.

According to the first aspect, Ar is 2,3,5,6-tetraphenylphenyl bearing in 4-position a substituent which is different from hydrogen.

In one embodiment, Ar is 2,3,5,6-tetraphenylphenyl bearing in 4-position a substituent selected from —R, —OR, —SR, —N(R)$_2$, —OC(O)R, —S(O)R, —SO$_2$R, —SO$_2$N(R)$_2$, —C(O)N(R)$_2$, —NRC(O)R, or —NRSO$_2$R; wherein each R is independently an optionally substituted group selected from $C_{1-10}$ aliphatic, $C_{1-10}$ heteroalkyl having 1-3 heteroatoms independently selected from nitrogen, oxygen or sulfur, phenyl, a 3-7 membered saturated or partially unsaturated carbocyclic ring, a 6-10 membered bicyclic saturated, partially unsaturated or aryl ring, a 5-6 membered monocyclic heteroaryl ring having 1-4 heteroatoms independently selected from nitrogen, oxygen or sulfur, a 3-7 membered saturated or partially unsaturated heterocyclic ring having 1-3 heteroatoms independently selected from nitrogen, oxygen or sulfur, a 7-10 membered bicyclic saturated or partially unsaturated heterocyclic ring having 1-5 heteroatoms independently selected from nitrogen, oxygen or sulfur, or an 8-10 membered bicyclic heteroaryl ring having 1-5 heteroatoms independently selected from nitrogen, oxygen or sulfur; or:

two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen or sulfur; or bearing in 4-position a substituent selected from halogen; nitro; cyano or an ester group C(O)OR$^7$, wherein $R^7$ is $C_{1-10}$ alkyl.

In one embodiment, the substituent which is different from hydrogen is selected from a substituent which is electron withdrawing relative to hydrogen.

In another embodiment, the substituent which is different from hydrogen is selected from a substituent which is electron donating relative to hydrogen.

In one embodiment, Ar is 2,3,5,6-tetraphenylphenyl bearing in 4-position a substituent selected from methyl, ethyl, n-propyl, isopropyl, n-butyl, t-butyl; methoxy, ethoxy, n-propoxy, iso-propoxy, n-butoxy, t-butyloxy; NH$_2$, dimethylamino, diethylamino, di(n-propyl)amino, and di(iso-propyl)amino.

In another embodiment, Ar is 2,3,5,6-tetraphenylphenyl bearing in 4-position a substituent selected from nitro; fluorine, chlorine, bromine or iodine; phenyl, optionally substituted; cyano; C(O)OCH$_3$, C(O)OC$_2$H$_5$ and C(O)OC$_3$H$_7$.

In a preferred embodiment according to the first aspect, the substituent in 4-position is an electron-withdrawing group selected from Br, NO$_2$, and CN.

In another preferred embodiment according to the first aspect, the substituent in 4-position is an electron-donating group selected from NH$_2$, N(CH$_3$)$_2$, and CH$_3$.

In another embodiment of the first aspect and the second aspect, wherein one or more of the phenyl substituents in 2, 3, 5, or 6 position are substituted with one or more substituents, said one or more substituents is/are selected from —R, —OR, —SR, —N(R)$_2$, —OC(O)R, —S(O)R, —SO$_2$R, —SO$_2$N(R)$_2$, —C(O)N(R)$_2$, —NRC(O)R, or —NRSO$_2$R; wherein each R is independently an optionally substituted group selected from $C_{1-10}$ aliphatic, $C_{1-10}$ heteroalkyl having 1-3 heteroatoms independently selected from nitrogen, oxygen or sulfur, phenyl, a 3-7 membered saturated or partially unsaturated carbocyclic ring, a 6-10 membered bicyclic saturated, partially unsaturated or aryl ring, a 5-6 membered monocyclic heteroaryl ring having 1-4 heteroatoms independently selected from nitrogen, oxygen or sulfur, a 3-7 membered saturated or partially unsaturated heterocyclic ring having 1-3 heteroatoms independently selected from nitrogen, oxygen or sulfur, a 7-10 membered bicyclic saturated or partially unsaturated heterocyclic ring having 1-5 heteroatoms independently selected from nitrogen, oxygen or sulfur, or an 8-10 membered bicyclic heteroaryl ring having 1-5 heteroatoms independently selected from nitrogen, oxygen or sulfur; or:

two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen or sulfur; or a substituent is selected from halogen, NO$_2$, and CN, or an ester group C(O)OR$^7$, wherein $R^7$ is $C_{1-10}$ alkyl.

In one embodiment of the first or second aspect, n=1.

In one embodiment of the first or second aspect, $R^5$ is selected from a phosphine. Preferably, $R^5$ is selected from P(CH$_3$)$_3$, P(CH$_3$)(C$_6$H$_5$)$_2$, P(CH$_3$)$_2$(C$_6$H$_5$), and P(cyclohexyl)$_3$.

In one embodiment of the first or second aspect, $R^5$ is selected from P(CH$_3$)$_3$, P(CH$_3$)(C$_6$H$_5$)$_2$, P(CH$_3$)$_2$(C$_6$H$_5$), and P(cyclohexyl)$_3$, and n is 1.

In one embodiment of the first aspect, the compound of formula (I) is of structure

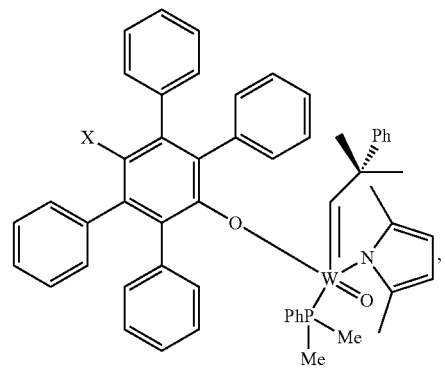

wherein X is Br, NO$_2$, CN, NH$_2$, N(CH$_3$)$_2$, or CH$_3$.

Br, NO$_2$, and CN represent electron-withdrawing groups.

NH$_2$, N(CH$_3$)$_2$, and CH$_3$ represent electron-donating groups.

In a preferred embodiment of the second aspect, the compound is

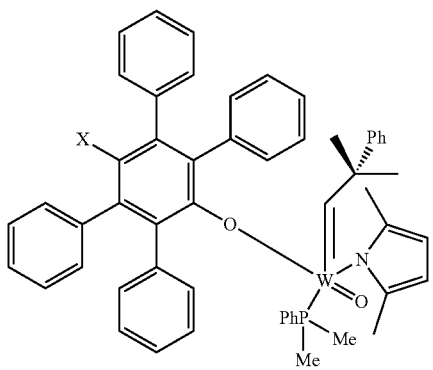

wherein X=H.

In a preferred embodiment, the phenyl substituents in 2, 3, 5, or 6-position are substituted with one or more substituents as defined above.

In one embodiment, the compound is

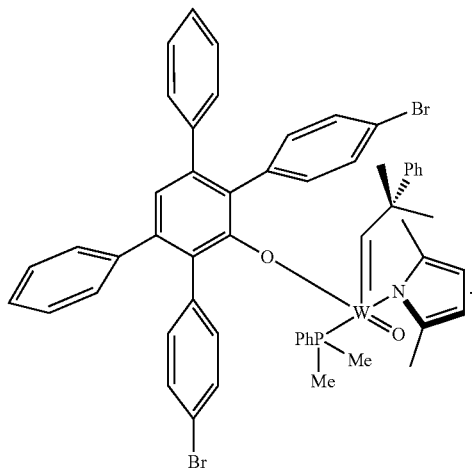

Compositions Comprising the Compounds as Defined in the First or Second Aspect

The compounds defined in the first and the second aspect may be used in ROMP of endo-DCPD.

In a third aspect, the present specification discloses a composition comprising a compound as defined in any one of the embodiments defined in the first aspect or second aspect; and endo-dicyclopentadiene or poly(dicyclopentadiiene).

Method of Performing a Ring-Opening Metathesis Reaction

In a fourth aspect, the present specification discloses a method of performing a ring-opening metathesis polymerization (ROMP), comprising contacting a compound as defined in the first aspect or the second aspect with dicyclopentadiene.

Conditions sufficient to cause a ring-opening metathesis polymerization of endo-DCPD are e.g. known from prior art as referred to in the Background section.

In one embodiment, the catalyst may be activated by a Lewis acid, i.e. the contacting is performed in the presence of a Lewis acid in order to increase or to modify the activity of the catalyst.

In one embodiment, the contacting is performed in the presence of a Lewis acid containing boron.

In still another embodiment, the contacting is performed in the presence of $B(C_6F_5)_3$.

Method of Making the Compounds Defined in the First or Second Aspect

The compounds defined in the first aspect and the second aspect may be prepared according to known methods as disclosed e.g. in Forrest, William P. et al: "Tungsten Oxo Alkylidene Complexes as Initiators for the Stereoregular Polymerization of 2,3-Dicarboxymethoxynorbornadiene", Organometallics 2014, 33, 2313-2325.

This publication discloses the reaction of a tungsten oxo akylidene complex ligated with the 2,3,5,6-tetraphenylphenoxy ligand and a chloro ligand, with a lithium pyrrolide via exchange of the chloro ligand by pyrrolide in order to afford the compound as defined in the Background section.

The inventors of the present invention discovered that decomposition or undesired side-reactions could be regularly observed when performing the ligand exchange according to the method of the prior art. This particularly applied in attempts to scale up the reaction to an industrial scale.

Similar side reactions could be observed when dichloro tungsten oxo complexes known from the prior art (Peryshkov, V. and Schrock, R. R.: "Synthesis of Tungsten Oxo Alkylidene Complexes", Organometallics 31, 20, 7278-728) were treated first with the lithium 2,3,5,6-tetraphenylphenoxide and then with lithium pyrrolide, or vice versa.

The inventors discovered that the compounds according to the first aspect and the second aspect may be advantageously prepared without the addressed drawbacks when a respective bis(N-containing heteroaryl) complex such as a bispyrrolide complex is reacted with a 2,3,5,6-tetraphenylphenol or the phenolate thereof.

Accordingly, in a fifth aspect, the invention relates to a method of making a compound of formula I or formula II comprising reacting a compound of formula (III)

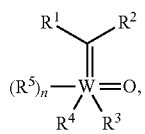

wherein $R^1$, $R^2$, $R^5$ and n have the meaning as defined above, preferably wherein n=2;

$R^3=R^4$=optionally substituted 5-14 membered heteroaryl having 1-4 heteroatoms independently selected from nitrogen, oxygen or sulfur, wherein at least one heteroatom is nitrogen; and wherein said heteroaryl ring is coordinated to W via said nitrogen atom; preferably pyrrol-1-yl, 2,5-dimethylpyrrol-1-yl or 2,5-diphenylpyrrol-1-yl or indol-1-yl;

with a suitable 2,3,5,6-tetraphenylphenol.

The phenol may also be provided in the form of a 2,3,5,6-tetraphenylphenolate, preferably as Li phenolate. However, it is preferred to use the respective phenol.

In one embodiment, the method comprises prior to the above reaction a reaction of a compound of formula (IV)

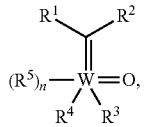

wherein $R^1$, $R^2$, $R^5$ and n have the meaning as defined above; and
$R^3=R^4=$halogen, preferably Cl;
with an optionally substituted salt of a 5-14 membered heteroaryl having 1-4 heteroatoms independently selected from nitrogen, oxygen or sulfur, wherein at least one heteroatom is a negatively charged nitrogen; preferably pyrrolide, 2,5-dimethylpyrrolide or 2,5-diphenylpyrrolide; and wherein the counterion preferably is lithium;
to afford the compound of formula (III).

Compounds of formula (IV) are known or may be prepared according to known methods (see Peryshkov, V. and Schrock, R. R. as referred to above).

The reaction is exemplarily shown in the following scheme, wherein $W(O)(CHCMe_2Ph)(Cl)_2(PPhMe_2)_2$ is reacted with Li 2,5-dimethylpyrrolide (Li 2,5-$(CH_3)_2C_4H_2N$) to afford $W(O)(CHCMe_2Ph)(2,5-(CH_3)_2C_4H_2N)_2(PPhMe_2)$:

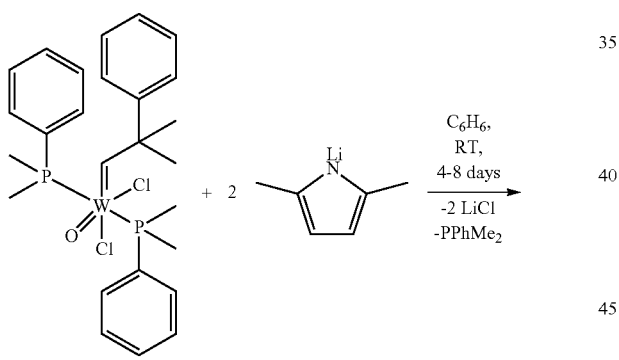

Subsequent reaction of $W(O)(CHCMe_2Ph)(2,5-(CH_3)_2C_4H_2N)_2(PPhMe_2)$ with e.g. 4-Br-2,3,5,6-tetraphenylphenol yields the respective target compound as defined in the first aspect as shown in the following scheme:

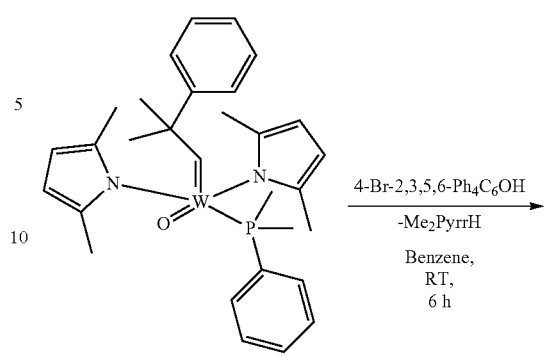

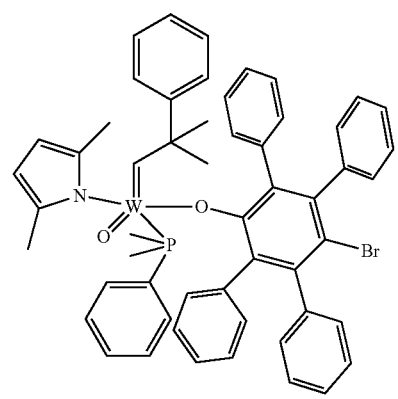

Analogously, the reaction of $W(O)(CHCMe_2Ph)(2,5-(CH_3)_2C_4H_2N)_2(PPhMe_2)$ with 2,3,5,6-tetraphenylphenol yields the respective complex as defined in the second aspect:

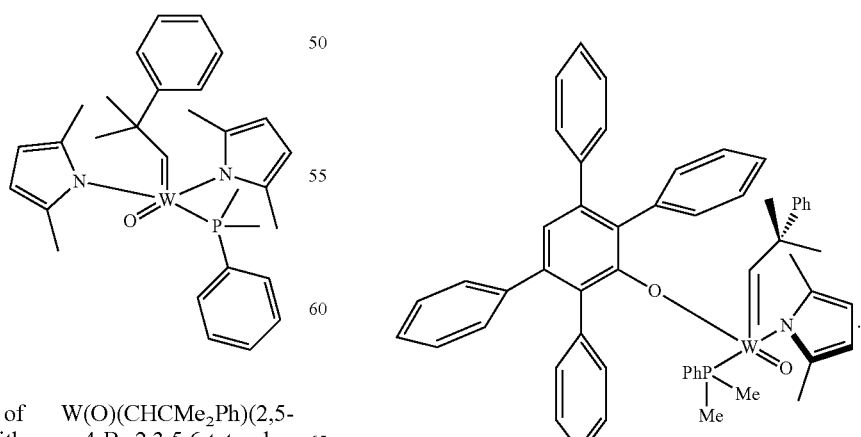

In one embodiment, the method allows an improved synthesis of compound

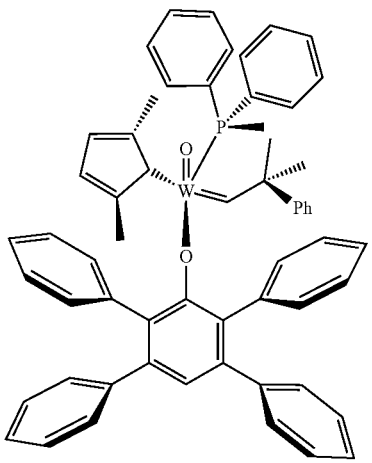

known from the prior art, wherein the method overcomes the addressed drawbacks.

The method requires the reaction of compound W(O)(CHCMe$_2$Ph)(2,5-(CH$_3$)$_2$C$_4$H$_2$N)$_2$(PPh$_2$Me) with 2,3,5,6-tetraphenylphenol.

Prior to the reaction, W(O)(CHCMe$_2$Ph)(2,5-(CH$_3$)$_2$C$_4$H$_2$N)$_2$(PPh$_2$Me) is made by converting W(O)(CHCMe$_2$Ph)(Cl)$_2$(PPh$_2$Me)$_2$ with Li 2,5-dimethylpyrrolide (Li 2,5-(CH$_3$)$_2$C$_4$H$_2$N) to afford the required starting material.

Accordingly, the invention also relates to a method of making

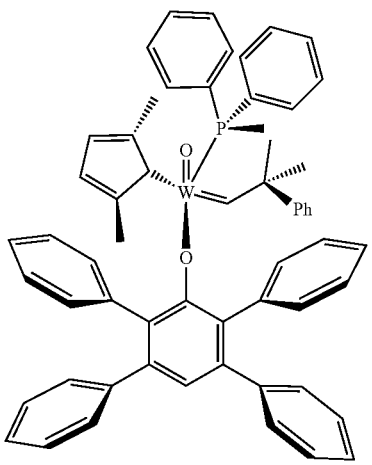

comprising:
reacting a compound of formula (V)

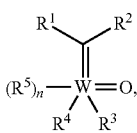

wherein one of R$^1$ and R$^2$ is H and the other is C(CH$_3$)$_2$C$_6$H$_5$;
R$^3$=R$^4$=2,5-dimethylpyrrol-1-yl;
R$^5$=P(CH$_3$)(C$_6$H$_5$)$_2$;
n=1;
with 2,3,5,6-tetraphenylphenol or the phenolate thereof.

The inventors further discovered that in the disclosed manufacturing methods of phosphorus-containing compounds as defined in the first aspect the use of P(CH$_3$)$_2$C$_6$H$_5$ as a neutral ligand is advantageous over the use of PCH$_3$(C$_6$H$_5$)$_2$. The inventors discovered that the yields obtained with starting complexes in which R$^5$=P(CH$_3$)$_2$C$_6$H$_5$ are in general much better than those obtained with starting complexes in which R$^5$=PCH$_3$(C$_6$H$_5$)$_2$.

Moreover, the inventors also discovered that the final complexes in which R$^5$=P(CH$_3$)$_2$C$_6$H$_5$ in general have a greater stability than those in which R$^5$=PCH$_3$(C$_6$H$_5$)$_2$. This may be advantageous in view of the subsequent ROMP reaction e.g. in terms of higher turnover numbers.

Accordingly, the use of P(CH$_3$)$_2$C$_6$H$_5$ both in starting materials for the manufacture of the final complex as well as in the final complex as defined in the first aspect is preferred over the use of PCH$_3$(C$_6$H$_5$)$_2$.

Accordingly, a particular preferred neutral phosphorus-containing ligand R$^5$ is P(CH$_3$)$_2$C$_6$H$_5$.

Compounds of Formula (III) as Precursors

As mentioned above, the complexes of formula (III) may be prepared according to known methods from the respective dichloro compounds [formula (IV): R$^3$=R$^4$=Cl] by reaction with a suitable N-containing heterocycle such as a pyrrol or a pyrrolide.

Accordingly, in a sixth aspect, the invention relates to a compound of formula (III)

wherein R$^1$, R$^2$, R$^5$ and n have the meaning as defined above; R$^3$=R$^4$=optionally substituted 5-14 membered heteroaryl having 1-4 heteroatoms independently selected from nitrogen, oxygen or sulfur, wherein at least one heteroatom is nitrogen; and wherein said heteroaryl ring is coordinated to W via said nitrogen atom; preferably pyrrol-1-yl, 2,5-dimethylpyrrol-1-yl or 2,6-diphenylpyrrol-1-yl.

2,3,5,6-tetraphenylphenols and Preparation Thereof 2,3,5,6-tetrapenylphenols are known or may be prepared according to known methods.

E.g., 4-bromo-2,3,5,6-tetraphenylphenol is a known compound (CAS no. 1974-42-1). It may be used as starting material for synthesizing other 2,3,5,6-tetraphenylphenols which are substituted in 4-position. Exemplary reactions are shown in the EXAMPLES section.

Catalyst Library

According to a seventh aspect, the invention relates to a catalyst library consisting of the catalysts defined in the first and the second aspect, preferably wherein the library further includes

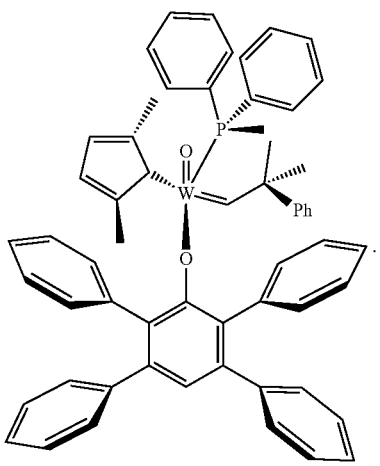

The catalyst library may be used in methods of high-throughput-screening.

Eighth Aspect

In an eighth aspect, the invention relates to complexes in which the phosphorus-containing ligand of the compound of formula I has been replaced by a nitrogen-containing ligand, wherein the nitrogen-containing ligand is a pyridine.

In these complexes, the 2,3,5,6-tetraphenlyphenoxy ligand may be substituted or unsubstituted.

Accordingly, the invention can be extended to the following items:

1. A compound of formula (I):

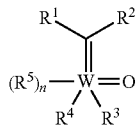

wherein:
each of $R^1$ and $R^2$ is independently —R, —OR, —SR, —N(R)$_2$, —OC(O)R, —S(O)R, —SO$_2$R, —SO$_2$N(R)$_2$, —C(O)N(R)$_2$, —NRC(O)R, or —NRSO$_2$R; wherein each R is independently hydrogen or an optionally substituted group selected from $C_{1-10}$ aliphatic, $C_{1-10}$ heteroalkyl having 1-3 heteroatoms independently selected from nitrogen, oxygen or sulfur, phenyl, a 3-7 membered saturated or partially unsaturated carbocyclic ring, a 6-10 membered bicyclic saturated, partially unsaturated or aryl ring, a 5-6 membered monocyclic heteroaryl ring having 1-4 heteroatoms independently selected from nitrogen, oxygen or sulfur, a 3-7 membered saturated or partially unsaturated heterocyclic ring having 1-3 heteroatoms independently selected from nitrogen, oxygen or sulfur, a 7-10 membered bicyclic saturated or partially unsaturated heterocyclic ring having 1-5 heteroatoms independently selected from nitrogen, oxygen or sulfur, or an 8-10 membered bicyclic heteroaryl ring having 1-5 heteroatoms independently selected from nitrogen, oxygen or sulfur; or:

two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen or sulfur;

$R^3$ is optionally substituted 5-14 membered heteroaryl having 1-4 heteroatoms independently selected from nitrogen, oxygen or sulfur, wherein at least one heteroatom is nitrogen; and wherein said heteroaryl ring is coordinated to W via said nitrogen atom;

$R^4$ is —OAr; wherein
Ar is 2,3,5,6-tetraphenylphenyl; or
Ar is 2,3,5,6-tetraphenylphenyl, and wherein one or more of the phenyl substituents in 2, 3, 5, or 6-position is/are substituted; or
Ar is 2,3,5,6-tetraphenylphenyl bearing in 4-position a substituent which is different from hydrogen; or
Ar is 2,3,5,6-tetraphenylphenyl bearing in 4-position a substituent which is different from hydrogen, and wherein one or more of the phenyl substituents in 2, 3, 5, or 6-position is/are substituted;

n is 0, 1 or 2; and
each $R^5$ is independently a nitrogen-containing ligand, wherein the nitrogen-containing ligand is bonded to W through a nitrogen atom, and wherein the nitrogen-containing ligand is a pyridine.

2. The compound of item 1, wherein
one of $R^1$ and $R^2$ is hydrogen and the other is an optionally substituted group selected from $C_{1-10}$ aliphatic.

3. The compound of any one of items 1 to 2, wherein one of $R^1$ and $R^2$ is hydrogen and the other is selected from C(CH$_3$)$_3$, C(CH$_3$)$_2$C$_6$H$_5$, or phenyl or phenyl bearing in 2-position a residue —O—$R^6$, wherein $R^6$ is selected from $C_{1-6}$ alkyl.

4. The compound of any one of items 1 to 3, wherein $R^3$ is selected from optionally substituted pyrrol-1-yl such as 2,5-dimethylpyrrol-1-yl or 2,5-diphenylpyrrol-1-yl or indol-1-yl.

5. The compound of any one of items 1 to 4, wherein $R^3$ is selected from pyrrol-1-yl, 2,5-dimethylpyrrol-1-yl, or 2,5-diphenylpyrrol-1-yl.

6. The compound of any one of items 1 to 5, wherein Ar is 2,3,5,6-tetraphenylphenyl bearing in 4-position a substituent selected from —R, —OR, —SR, —N(R)$_2$, —OC(O)R, —S(O)R, —SO$_2$R, —SO$_2$N(R)$_2$, —C(O)N(R)$_2$, —NRC(O)R, or —NRSO$_2$R; wherein each R is independently an optionally substituted group selected from $C_{1-10}$ aliphatic, $C_{1-10}$ heteroalkyl having 1-3 heteroatoms independently selected from nitrogen, oxygen or sulfur, phenyl, a 3-7 membered saturated or partially unsaturated carbocyclic ring, a 6-10 membered bicyclic saturated, partially unsaturated or aryl ring, a 5-6 membered monocyclic heteroaryl ring having 1-4 heteroatoms independently selected from nitrogen, oxygen or sulfur, a 3-7 membered saturated or partially unsaturated heterocyclic ring having 1-3 heteroatoms independently selected from nitrogen, oxygen or sulfur, a 7-10 membered bicyclic saturated or partially unsaturated heterocyclic ring having 1-5 heteroatoms independently selected from nitrogen, oxygen or sulfur, or an 8-10 membered bicyclic heteroaryl ring having 1-5 heteroatoms independently selected from nitrogen, oxygen or sulfur; or:

two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen or sulfur; or bearing in 4-position a substituent selected from halogen; nitro; cyano or an ester group C(O)OR$^7$, wherein R$^7$ is C$_{1-10}$ alkyl.

7. The compound of any one of items 1 to 6, wherein
   Ar is 2,3,5,6-tetraphenylphenyl bearing in 4-position a substituent selected from a substituent which is electron withdrawing or which is electron donating relative to a substituent which is hydrogen.

8. The compound of any one of items 1 to 7, wherein Ar is 2,3,5,6-tetraphenylphenyl bearing in 4-position a substituent selected from methyl, ethyl, n-propyl, isopropyl, n-butyl, t-butyl; methoxy, ethoxy, n-propoxy, iso-propoxy, n-butoxy, t-butyloxy; NH$_2$, dimethylamino, diethylamino, di(n-propyl)amino, di(iso-propyl)amino; nitro; fluorine, chlorine, bromine or iodine; phenyl, optionally substituted; cyano; C(O)OCH$_3$, C(O)OC$_2$H$_5$ or C(O)OC$_3$H$_7$.

9. The compound of any one of items 1 to 8, wherein Ar is 2,3,5,6-tetraphenylphenyl bearing in 4-position a substituent selected from Br, nitro, cyano, NH$_2$, N(CH$_3$)$_2$ or CH$_3$.

10. The compound of any one of items 1 to 9, wherein one or more of the phenyl substituents in 2, 3, 5, or 6 position is/are substituted with one or more substituents, and wherein said substituents are selected from —R, —OR, —SR, —N(R)$_2$, —OC(O)R, —S(O)R, —SO$_2$R, —SO$_2$N(R)$_2$, —C(O)N(R)$_2$, —NRC(O)R, or —NRSO$_2$R; wherein each R is independently an optionally substituted group selected from C$_{1-10}$ aliphatic, C$_{1-10}$ heteroalkyl having 1-3 heteroatoms independently selected from nitrogen, oxygen or sulfur, phenyl, a 3-7 membered saturated or partially unsaturated carbocyclic ring, a 6-10 membered bicyclic saturated, partially unsaturated or aryl ring, a 5-6 membered monocyclic heteroaryl ring having 1-4 heteroatoms independently selected from nitrogen, oxygen or sulfur, a 3-7 membered saturated or partially unsaturated heterocyclic ring having 1-3 heteroatoms independently selected from nitrogen, oxygen or sulfur, a 7-10 membered bicyclic saturated or partially unsaturated heterocyclic ring having 1-5 heteroatoms independently selected from nitrogen, oxygen or sulfur, or an 8-10 membered bicyclic heteroaryl ring having 1-5 heteroatoms independently selected from nitrogen, oxygen or sulfur; or:
   two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen or sulfur; or
   a substituent selected from halogen; nitro; cyano or an ester group C(O)OR$^6$, wherein R$^6$ is C$_{1-10}$ alkyl.

11. The compound of any one of items 1 to 10, wherein the nitrogen-containing ligand R$^5$ is selected from pyridine or pyridine substituted with one or more substituents selected from C$_{1-6}$alkyl, C$_{1-6}$ alkoxy, halogen, CN, or phenyl.

12. The compound of any one of items 1 to 11, wherein n=1.

13. The compound of item 1, wherein the compound is selected from

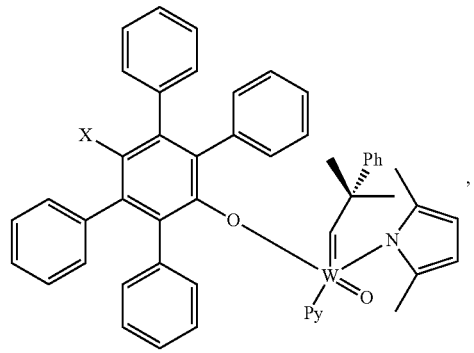

wherein X is an electron-withdrawing substituent selected from Br, NO$_2$, or CN; or
wherein X is an electron-donating substituent selected from NH$_2$, N(CH$_3$)$_2$, or CH$_3$;
and Py=pyridine.

14. The compound of item 1, wherein the compound is

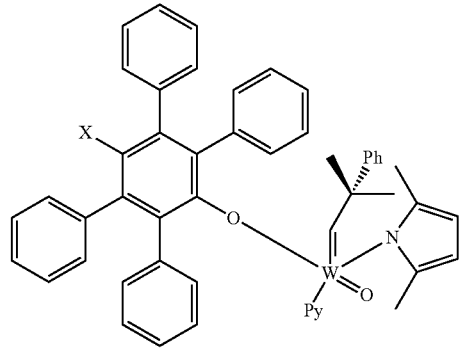

wherein X=H; or
wherein the compound is

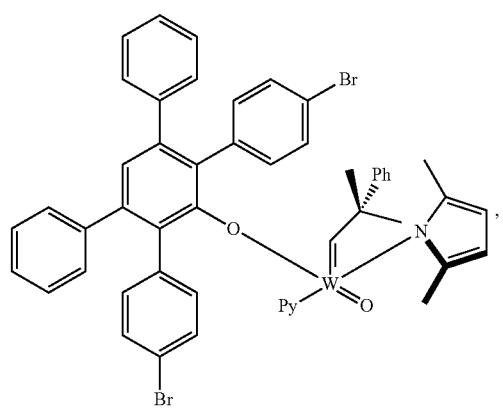

and Py=pyridine.

15. Method of making a compound of formula I as defined in any one of items 1 to 14, comprising
reacting a compound of formula III

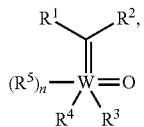

III wherein R³=R⁴=optionally substituted 5-14 membered heteroaryl having 1-4 heteroatoms independently selected from nitrogen, oxygen or sulfur, wherein at least one heteroatom is nitrogen; and wherein said heteroaryl ring is coordinated to W via said nitrogen atom; preferably pyrrol-1-yl, 2,5-dimethylpyrrol-1-yl or 2,5-diphenylpyrrol-1-yl;
with 2,3,5,6-tetraphenylphenol or a substituted 2,3,5,6-tetraphenylphenol or the phenolate thereof, respectively;
wherein $R^1$, $R^2$, $R^5$ and n and the substituted 2,3,5,6-tetraphenylphenol have the meaning as defined in any one of claims 1 to 14.

16. Method of item 15, further comprising:
reacting a compound of formula (VI)

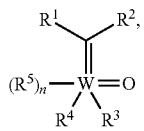

VI wherein $R^1$, $R^2$, and n have the meaning as defined in claim 15;
R³=R⁴=halogen, preferably Cl;
R⁵ is independently a phosphorus-containing ligand, wherein the phosphorus-containing ligand is bonded to W through a phosphorus atom, preferably wherein the phosphorus-containing ligand is selected from $P(CH_3)_3$, $P(CH_3)(C_6H_5)_2$, $P(CH_3)_2(C_6H_5)$, or $P(cyclohexyl)_3$ and n is 1 or 2;
with an optionally substituted salt of a 5-14 membered heteroaryl having 1-4 heteroatoms independently selected from nitrogen, oxygen or sulfur, wherein at least one heteroatom is a negatively charged nitrogen; preferably pyrrolide, 2,5-dimethylpyrrolide or 2,5-diphenylpyrrolide; and wherein the counterion preferably is lithium;
and with a nitrogen-containing ligand as defined in item 1 or 11;
to afford the compound of formula (VI).

17. Compound of formula (III)

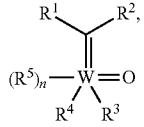

III wherein $R^1$, $R^2$, $R^5$ and n have the meaning as defined in any one of items 1 to 14, preferably wherein n=1;

R³=R⁴=optionally substituted 5-14 membered heteroaryl having 1-4 heteroatoms independently selected from nitrogen, oxygen or sulfur, wherein at least one heteroatom is nitrogen; and wherein said heteroaryl ring is coordinated to W via said nitrogen atom; preferably pyrrol-1-yl, 2,5-dimethylpyrrol-1-yl or 2,5-diphenylpyrrol-1-yl.

18. Catalyst library consisting of the compounds defined in any one of items 1 to 14.

The compounds defined in the eighth aspect may also be employed in ROMP pf endo-DCPD.

In one embodiment, the catalyst library may also contain the compounds defined in the first or second aspect.

The synthesis of the new compounds is exemplarily shown as follows.

The pyridine-containing W-oxo-bispyrrolide complex according to the invention was reacted with 2,3,5,6-Ph₄C₆OH (TPPOH) and 4-Br-2,3,5,6-Ph₄C₆OH (4-Br-TPPOH) as shown in the following scheme:

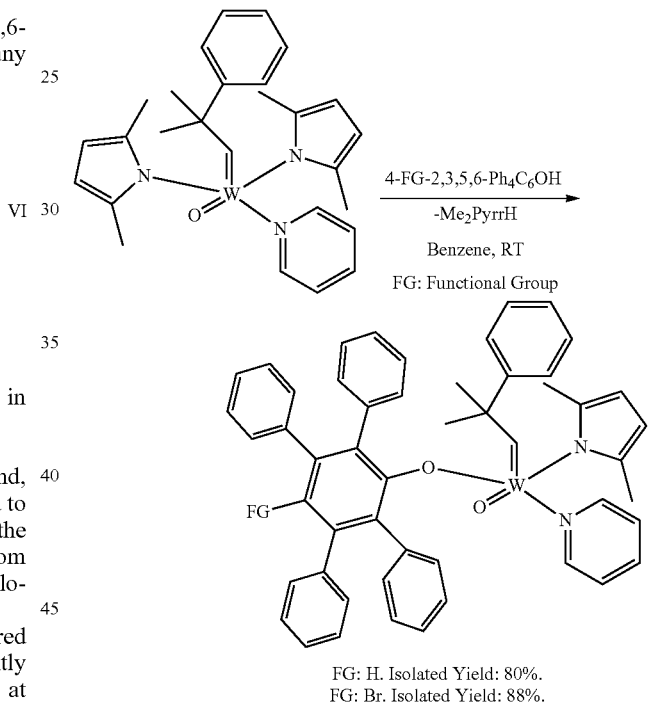

FG: H. Isolated Yield: 80%.
FG: Br. Isolated Yield: 88%.

Performing the reactions with one equivalent of the phenol, in benzene, at room temperature, exclusive formation of the expected pyridine adducts could be observed by ¹H NMR. W(O)(CHCMe₂Ph)(Me₂Pyrr)(TPPO)(pyridine) (TPPO=2,3,5,6-Ph₄C₆O—) and W(O)(CHCMe₂Ph)(Me₂Pyrr)(4-Br-TPPO)(pyridine) (4-Br-TPPO=4-Br-2,3,5,6-Ph₄C₆O⁻) could be isolated in good yield.

Since nitrogen-containing ligands such as pyridine defined in the eighth aspect may be considerably cheaper than phosphorus-containing ligands such as the phosphines defined in the first aspect, the respective nitrogen-containing complexes such as compounds W(O)(CHCMe₂Ph)(Me₂Pyrr)(TPPO)(pyridine) and W(O)(CHCMe₂Ph)(Me₂Pyrr)(4-Br-TPPO)(pyridine) might be considerably cheaper alternatives to the phosphine-containing complexes used in ROMP of DCPD. This might be advantageous in view of an industrial application.

EXAMPLES

Preparation of 2,3,5,6-tetraphenyl phenol ligands

4-NO$_2$-2,3,5,6-tetraphenyl phenol

4-Br-2,3,5,6-tetraphenyl phenol (6.27 mmol, 2993 mg, 1.0 eq) was stirred in acetonitrile (45 mL) as a slurry. Subsequently, AgNO$_2$ (9.4 mmol, 1447 mg, 1.5 eq) was added. The mixture was heated at 80° C. for 20 h. Precipitate was filtered off. The organic phase was concentrated and was purified by column chromatography (coated on silica gel, eluted with dichloromethane (DCM):heptane 1:1 (gradient). 1309 mg, 47% yield.
$^{13}$C{$^1$H}-NMR (CD$_2$Cl$_2$, $\delta_{ref\ 13C\ solvent}$=53.8 ppm, $\delta$ (ppm)): 128.2 (C3-Ph $C_{para}$) 128.2 (C3-Ph $C_{meta}$), 128.3 (C2-Ph $C_{para}$) 128.7 (C2), 128.8 (C2-Ph $C_{meta}$), 130.1 (C3-Ph $C_{ortho}$) 131.1 (C2-Ph $C_{ortho}$), 134.1 (C3), 134.5 (C2-Ph $C_{ipso}$), 135.2 (C3-Ph $C_{ipso}$), 146.1 (C4-NO$_2$), 150.0 (C1-O).

4-CN-2,3,5,6-tetraphenyl phenol

4-Br-2,3,5,6-tetraphenyl phenol (4.18 mmol, 1996 mg, 1.0 eq) was added to DMF (20 mL) and CuCN (8.36 mmol, 744 mg, 2.0 eq). The resulting mixture was heated at 120° C. in a capped vial overnight. The reaction mixture was added to 100 mL of water. Precipitate was filtered off, washed with water and air-dried. The crude, poor soluble (DCM) product was coated on silica gel (100 mL) and was eluted first with mixture of 33% DCM in heptanes, then with 66% DCM in heptanes. 980 mg, 55% yield.
$^{13}$C{$^1$H}-NMR (CD$_2$Cl$_2$, $\delta_{ref\ 13C\ solvent}$=53.8 ppm, $\delta$ (ppm)): 106.6 (C4), 118.4 (CN), 128.16 (C3-Ph $C_{para}$) 128.16 (C3-Ph $C_{meta}$), 128.21 (C2-Ph $C_{para}$) 128.7 (C2), 128.9 (C2-Ph $C_{meta}$), 130.4 (C3-Ph $C_{ortho}$), 131.2 (C2-Ph $C_{ortho}$), 134.6 (C2-Ph $C_{ipso}$), 138.1 (C3-Ph $C_{ipso}$), 146.5 (C3), 154.1 (C1-O).

4-NH$_2$-2,3,5,6-tetraphenyl phenol

4-NO$_2$-2,3,5,6-tetraphenyl phenol (1.74 mmol, 770 mg) was added to THF (100 mL). The resulting mixture was subjected to catalytic hydrogenation in presence of PtO$_2$ (0.17 mmol, 39 mg, 0.1 eq) at 50° C., 20 bar H$_2$ pressure. The crude product was coated on silica gel and purified by column chromatography (DCM:heptane gradient 1:1 to pure DCM). 240 mg, 33% yield.

4-Br-2,3,5,6-tetraphenyl anisole

4-Br-2,3,5,6-tetraphenyl phenol (19.096 g, 40.0 mmol and potassium carbonate (11.057 g, 80 mmol, 2.0 eq) were slurried in acetone (600 mL). Iodomethane (8.516 g, 3.74 mL, 1.5 eq) was added and stirring was maintained during 48 h. Solids were removed by filtration and the wet cake was washed with acetone (3×50 mL). The filtrate was concentrated and the residue was triturated with DCM (2×20 mL) affording the title compound (16.125 g, 82% yield).

4-Me-2,3,5,6-tetraphenyl anisole

4-Br-2,3,5,6-tetraphenyl anisole (983 mg, 2.0 mmol) was suspended in THF (30 mL) and BuLi solution (0.8 mL, 2.5 M, 2.0 mmol, 1.0 eq) was added dropwise at −78° C. followed by iodomethane (426 mg, 3.0 mmol, 0.187 mL, 1.5 eq). The resulting solution was allowed to reach rt, was subjected to extraction with cc. aq. bicarbonate solution (50 mL) and the wet phase was back extracted with DCM (50 mL). The combined organic phases were concentrated and the residue was column chromatographed (heptanes/DCM 1:1 gradient) affording the title compound (450 mg, 53% yield).

4-Me-2,3,5,6-tetraphenyl phenol

4-Me-2,3,5,6-tetraphenyl anisole (1.00 mmol, 427 mg) was added to DCM (50 mL) followed by BBr$_3$ (2.00 mmol, 501 mg, 193 □L) at rt for 1 h. The reaction mixture was diluted with DCM (50 mL), extracted with H$_2$O, with cc. aq. NaHCO$_3$, finally with H$_2$O again. The DCM phase was dried over Na$_2$SO$_4$, concentrated (401 mg, 97%). The product was used in next step without further purification.

The following scheme shows an overview of the above described syntheses of the ligands using 4-bromo-2,3,5,6,-tetraphenlyphenol as the starting material:

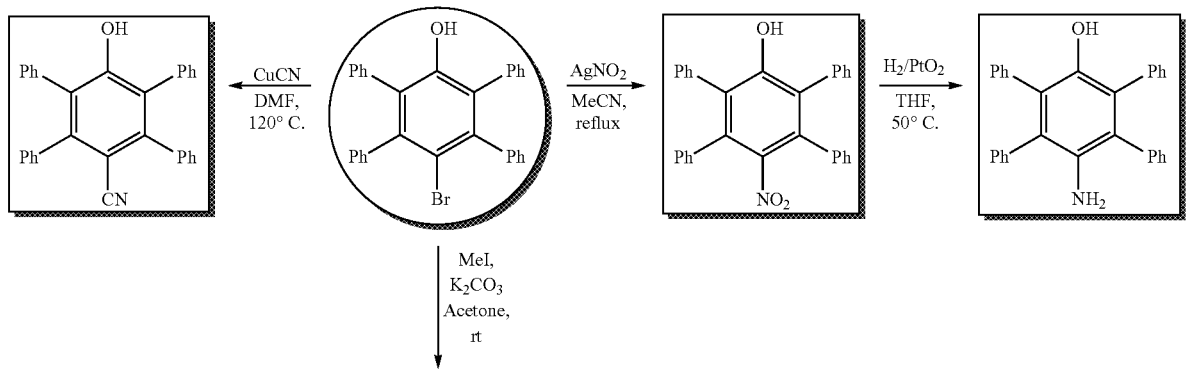

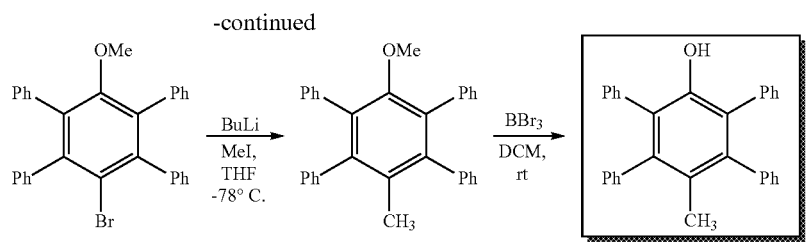

Preparation of Precursors of Formula (III) According to the Invention

Synthesis of W(O)(CHCMe$_2$Ph)(Me$_2$Pyrr)$_2$(PPhMe$_2$)

(O)(CHCMe$_2$Ph)(Cl)$_2$(PPhMe$_2$)$_2$ (11.30 g, 16.6 mmol) and 2,5-Me$_2$PyrrLi (3.53 g, 34.9 mmol) were stirred in benzene (300 mL) at RT for 112 hours. The reaction mixture turned deep red, and LiCl precipitated from the solution. The stirring was stopped, the LiCl was allowed to settle, an aliquot was taken from the clear part of the solution, and analyzed by NMR. The $^1$H NMR spectrum indicated complete conversion. The solution was filtered through a pad of Celite to remove LiCl. The benzene was removed from the clear solution in vacuum, and the residue was triturated in pentane (30 mL), yielding the product as a deep orange solid. The product was isolated by filtration. Orange solid. Yield: 8.70 g (79%).

$^1$H-NMR (C$_6$D$_6$): 1.07 (d, 6H, $^2$J$_{PH}$=7.6 Hz, CH$_3$ PPhMe$_2$), 1.60 (s, 6H, CH$_3$ neophilidene), 2.27 (s br, 12H, CH$_3$ Me$_2$Pyrr), 6.15 (s, 4H, CH Me$_2$Pyrr), 6.83 (m, 2H, C$_{meta}$—H PPhMe$_2$), 6.95 (m, 3H, C$_{ortho}$—H, C$_{para}$—H PPhMe$_2$), 7.02 (m, 1H, C$_{para}$—H neophilidene), 7.12 (m, 2H, C$_{meta}$—H neophilidene), 7.20 (m, 2H, C$_{ortho}$—H neophilidene), 9.83 ppm (s, $^2$J$_{WH}$=11.4 Hz, 1H, W=CH).

Preparation of Compounds of Formula (I) or Formula (II) According to the Invention Example 1

Synthesis of

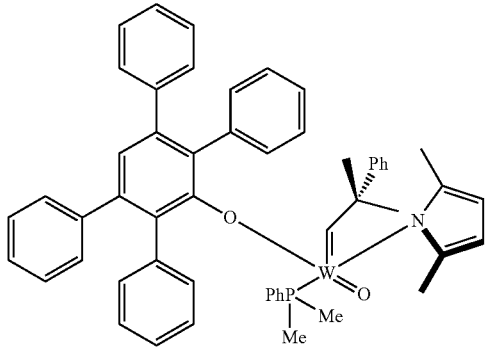

as a compound according to the second aspect:

W(O)(CHCMe$_2$Ph)(Me$_2$Pyrr)$_2$(PPhMe$_2$) (400 mg, 0.607 mmol) was dissolved in benzene (3 mL). 2,3,5,6-tetraphenyl phenol (TPPOH) (242 mg, 0.607 mmol) was added as a solid. The residues from its vial were rinsed into the reaction mixture with benzene (2 mL). The reaction mixture was stirred at room temperature for 3 hours. 1H NMR analysis of the reaction mixture indicated complete conversion. The solvent was removed in vacuum. The residue, a yellowish light brown solid foam, was triturated with pentane (8 mL), yielding the product as yellow solid. The product was isolated by filtration, washed with pentane (ca. 5 mL in total), and dried in N$_2$ stream. Yellow solid. Yield: 497 mg (85%).

$^1$H-NMR (C$_6$D$_6$, 300 MHz): 1.01 (d, 6H, $^2$J$_{PH}$=7.4 Hz, PPhMe$_2$), 1.42 (s, 3H, CH$_3$ neophylidene), 1.50 (s, 3H, CH$_3$ neophylidene), 2.36 (s br, 6H, Me$_2$Pyrr), 6.38 (s, aromatic Me$_2$Pyrr), 6.85-7.19 (m, 30H, aromatic), 7.21 (s, 1H, C$_{para}$—H tetraphenylphenolate), 10.76 (br, 1H, W=CH) ppm.

Example 2

Synthesis of W(O)(CHCMe$_2$Ph)(Me$_2$Pyrr)(4-Br-TPPO)(PPhMe$_2$) according to the first aspect:

W(O)(CHCMe$_2$Ph)(Me$_2$Pyrr)$_2$(PPhMe$_2$) was reacted analogously to Example 1 with 4-Br-2,3,5,6-tetraphenylphenol (4-Br-TPPOH) to afford W(O)(CHCMe$_2$Ph)(Me$_2$Pyrr)(4-Br-TPPO)(PPhMe$_2$) (Me$_2$Pyrr=2,5-dimethylpyrrol-1-yl):

W(O)(CH=CMe$_2$Ph)(2,5-Me$_2$Pyrr)$_2$(PPhMe$_2$) (3225 mg, 4.9 mmol) was dissolved in benzene (50 mL). 4-Br-2,3,5,6-Ph$_4$C$_6$OH (2339 mg, 4.9 mmol) was added as a solid. The residues from its vial were rinsed into the reaction mixture with benzene (20 mL). The reaction mixture was stirred at RT for 6 hours. $^1$H NMR indicated the presence of the product, and a small amount of remaining phenol (3 mol %). Benzene solution of the bispyrrolide precursor was added slowly until the ratio of the remaining phenol dropped below 1%. The benzene was removed in vacuum. The residue was triturated in pentane (35 mL). The resulting yellow solid was isolated by filtration. It washed with pentane (20 mL in total), dried first in N$_2$ flow, and then in high vacuum. Yellow solid. Yield: 5044 mg (99%).

$^1$H-NMR (C$_6$D$_6$, 300 MHz, $\delta_{ref\,1H\,solvent}$=7.16 ppm): 1.06 (d, $^2$J$_{PH}$=8.3 Hz, 6H, CH$_3$ phosphine), 1.39 (s, 3H, CH$_3$ neophylidene), 1.43 (s, 3H, CH$_3$ neophylidene), 2.34 (s, 6H, CH$_3$ Me$_2$Pyr), 6.38 (s, 2H, CH Me$_2$Pyrr), 6.46-7.60 (m, 30H, aromatic), 10.51 (br, 1H, W=CH).

Examples 3 to 7

Synthesis of further compounds according to the first aspect:

W(O)(CHCMe$_2$Ph)(Me$_2$Pyrr)$_2$(PPhMe$_2$) was reacted analogously to Example 2 with 4-NO$_2$-TPPOH to afford W(O)(CHCMe$_2$Ph)(Me$_2$Pyrr)(4-NO$_2$-TPPO)(PPhMe$_2$) (Example 3);

4-CN-TPPOH to afford W(O)(CHCMe$_2$Ph)(Me$_2$Pyrr)(4-CN-TPPO)(PPhMe$_2$) (Example 4);

4-NH$_2$-TPPOH to afford W(O)(CHCMe$_2$Ph)(Me$_2$Pyrr)(4-NH$_2$-TPPO)(PPhMe$_2$) (Example 5);

4-N(CH$_3$)$_2$-TPPOH to afford W(O)(CHCMe$_2$Ph)(Me$_2$Pyrr)(4-N(CH$_3$)$_2$-TPPO)(PPhMe$_2$) (Example 6); and 4-CH$_3$-TPPOH to afford W(O)(CHCMe$_2$Ph)(Me$_2$Pyrr)(4-CH$_3$-TPPO)(PPhMe$_2$) (Example 7).

The following provides a more specific description of this disclosure in view of ROMP of DCPD based on examples. In the following description, "%" and "parts" used to express quantities are by mass, unless otherwise specified.

Measurements and evaluations in the examples were performed by the following methods:

Weight average molecular weight (Mw) and molecular weight distribution (Mw/Mn) of ring-opening polymer: The weight average molecular weight (Mw), number average molecular weight (Mn), and molecular weight distribution (Mw/Mn) were determined as values in terms of polystyrene by performing gel permeation chromatography (GPC) at 40° C. using tetrahydrofuran as a solvent. Measurement device: Gel permeation chromatography (GPC) system "HLC-8320" (produced by Tosoh Corporation) Column: "H type column" (produced by Tosoh Corporation)

Melting point of HDCPD polymer: The melting point of an HDCPD polymer was measured by differential scanning calorimetry performed with a heating rate of 10° C./minute using a differential scanning calorimeter (DSC).

Percentage hydrogenation of HDCPD polymer: The percentage hydrogenation of unsaturated bonds in an HDCPD polymer was determined based on $^1$H-NMR measurement.

Syndiotacticity of HDCPD polymer: The proportion of racemo diads in a hydrogenated dicyclopentadiene-based ring-opening polymer was determined through $^{13}$C-NMR measurement by an inverse-gated decoupling method at 200° C. using orthodichlorobenzene-d4/1,2,4-trichlorobenzene (TCB)-d3 (mixing ratio (mass basis): 1/2) as a solvent. Specifically, a peak for orthodichlorobenzene-d4 at 127.5 ppm was taken to be the standard shift and the proportion (%) of racemo diads was determined based on an intensity ratio of a signal at 43.35 ppm originating from meso diads and a signal at 43.43 ppm originating from racemo diads.

The term "diad" as used herein defines two adjacent structural units in a polymer molecule. If the diad consists of two identically oriented units, the diad is called a meso diad reflecting similar features as a meso compound. If the diad consists of units oriented in opposition, the diad is called a racemo diad as in a racemic compound. In the case of vinyl polymer molecules, a meso diad is one in which the book carbon chains are oriented on the same side of the polymer backbone.

Example 8: Manufacture of a Dicyclopentadiene-Based Ring-Opening Polymer

A pressure reactor made from metal that had been internally purged with nitrogen was charged with 344 parts of toluene, 286 parts (100 parts of dicyclopentadiene) of a toluene solution (concentration: 35%) of dicyclopentadiene (percentage content of endo isomer: 99% or more), and 1 part of 1-hexene as chain transfer agent, and the contents of the pressure reactor were heated to 35° C. A catalyst solution was separately produced by dissolving 0.100 parts of W(O)(CHCMe$_2$Ph)(Me$_2$Pyrr)(4-Br-TPPO)(PPhMe$_2$) from Example 2 as a ring-opening polymerization catalyst in 29 parts of toluene. This catalyst solution was added into the reactor and a ring-opening polymerization reaction was carried out for 1 hour at 35° C. to yield a solution containing a dicyclopentadiene-based ring-opening polymer. The polymerization reaction was terminated by adding 1.1 parts of 2-propanol as a terminator to 667 parts of the resultant solution containing the dicyclopentadiene-based ring-opening polymer. A portion of the resultant solution was used to measure the molecular weight of the dicyclopentadiene-based ring-opening polymer. As a result, it was determined that the dicyclopentadiene-based ring-opening polymer had a weight average molecular weight (M) of 24,300, a number average molecular weight (M$_n$) of 8,200, and a molecular weight distribution (M$_w$/M$_n$) of 2.96. The obtained solution was mixed with 2,000 parts of 2-propanol to perform reprecipitation, and then filtration and drying were performed to obtain 99 parts of the dicyclopentadiene-based ring-opening polymer.

Hydrogenation of ring-opening polymer: In a glass flask, 30.0 parts of the dicyclopentadiene-based ring-opening polymer, 170 parts of p-toluenesulfonyl hydrazide (hydrogenating agent), and 600 parts of p-xylene were mixed, and were then heated to 120° C. in a dry nitrogen atmosphere to perform a reaction for 4 hours. The reaction liquid was a slurry in which solid content had precipitated. Solid content and solution were then separated by centrifugal separation of the reaction liquid. The solid content was dried under reduced pressure for 24 hours at 60° C. to yield 27.0 parts of a hydrogenated dicyclopentadiene-based ring-opening polymer. The resultant hydrogenated dicyclopentadiene-based ring-opening polymer had a percentage hydrogenation of 99.4%, a melting point of 284° C., and a proportion of racemo diads (syndiotacticity) of 100%. The glass transition temperature of the resultant hydrogenated dicyclopentadiene-based ring-opening polymer was confirmed to be at least 90° C. and not higher than 120° C. using a differential scanning calorimeter (DSC).

Example 9

A solution containing a dicyclopentadiene-based ring-opening polymer was obtained in the same way as in Example 8 with the exception that 0.100 parts of W(O)(CHCMe$_2$Ph)(Me$_2$Pyrr)(4-NO$_2$-TPPO)(PPhMe$_2$) from Example 3 was used in the ring-opening polymerization reaction. A portion of this solution was used to measure the molecular weight of the dicyclopentadiene-based ring-opening polymer. As a result, it was determined that the dicyclopentadiene-based ring-opening polymer had a weight average molecular weight (M$_w$) of 25,000, a number average molecular weight (Mn) of 8,500, and a molecular weight distribution (Mw/Mn) of 2.94. The obtained solution was mixed with 2,000 parts of 2-propanol to perform reprecipitation, and then filtration and drying were performed to obtain 99 parts of the dicyclopentadiene-based ring-opening polymer. Subsequent steps were performed in the same way to obtain 26.9 parts of a hydrogenated dicyclopentadiene-based ring-opening polymer. The hydrogenated dicyclopentadiene-based ring-opening polymer had a percentage hydrogenation of 99.6%, a melting point of 286° C., and a proportion of racemo diads (syndiotacticity) of 99%. The glass transition temperature of the resultant hydrogenated dicyclopentadiene-based ring-opening polymer was confirmed to be at least 90° C. and not higher than 120° C. using a differential scanning calorimeter (DSC).

Example 10

A solution containing a dicyclopentadiene-based ring-opening polymer was obtained in the same way as in Example 8 with the exception that 0.100 parts of W(O)(CHCMe$_2$Ph)(Me$_2$Pyrr)(4-CN-TPPO)(PPhMe$_2$) from Example 4 was used in the ring-opening polymerization reaction. A portion of this solution was used to measure the molecular weight of the dicyclopentadiene-based ring-opening polymer. As a result, it was determined that the dicyclopentadiene-based ring-opening polymer had a weight average molecular weight (M) of 25,300, a number average molecular weight ($M_n$) of 8,400, and a molecular weight distribution ($M_w/M_n$) of 3.01. The obtained solution was mixed with 2,000 parts of 2-propanol to perform reprecipitation, and then filtration and drying were performed to obtain 99 parts of the dicyclopentadiene-based ring-opening polymer. Subsequent steps were performed in the same way to obtain 26.9 parts of a hydrogenated dicyclopentadiene-based ring-opening polymer. The hydrogenated dicyclopentadiene-based ring-opening polymer had a percentage hydrogenation of 99.2%, a melting point of 287° C., and a proportion of racemo diads (syndiotacticity) of 100%. The glass transition temperature of the resultant hydrogenated dicyclopentadiene-based ring-opening polymer was confirmed to be at least 90° C. and not higher than 120° C. using a differential scanning calorimeter (DSC).

Example 11

A solution containing a dicyclopentadiene-based ring-opening polymer was obtained in the same way as in Example 8 with the exception that 0.086 parts of W(O)(CHCMe$_2$Ph)(Me$_2$Pyrr)(TPPO)(PPhMe$_2$) was used in the ring-opening polymerization reaction. A portion of this solution was used to measure the molecular weight of the dicyclopentadiene-based ring-opening polymer. As a result, it was determined that the dicyclopentadiene-based ring-opening polymer had a weight average molecular weight ($M_w$) of 150,000, a number average molecular weight ($M_n$) of 52,000, and a molecular weight distribution ($M_w/M_n$) of 2.86. The obtained solution was mixed with 2,000 parts of 2-propanol to perform reprecipitation, and then filtration and drying were performed to obtain 99 parts of the dicyclopentadiene-based ring-opening polymer. Subsequent steps were performed in the same way to obtain 26.9 parts of a hydrogenated dicyclopentadiene-based ring-opening polymer. The hydrogenated dicyclopentadiene-based ring-opening polymer had a proportion of racemo diads (syndiotacticity) of 99%. The percentage hydrogenation was lower than 95%, and the melting point was lower than 250° C.

The examples show on one hand that the substitution in 4-position of the phenyloxy moiety may effectively improve ROMP of DCPD when using a small amount of chain-transfer agent which allows for the good controllability of the molecular weight and the high melting point of the formed PDCPD. The good controllability of the molecular weight and melting point of the present invention makes the PDCPD applicable for the further hydrogenation to improve its heat resistance.

On the other hand, substitution in 4-position of the phenyloxy moiety with hydrogen may provide for hydrogenated PDCPD having a high molecular weight which may be advantageous for other particular applications.

It could not be expected that the ROPM reaction—depending on the substitution of the tetraphenylphenoxy moiety in para position with either hydrogen or a substituent being different therefrom—may be directed to polymers having a comparatively low molecular weight but a high melting point or to polymers having a comparatively high molecular weight but a low melting point. The inventors hold that this unexpected finding may be of particular benefit in view of applications.

Preparation of Precursors (III) Containing a Nitrogen-Containing Ligand:
Synthesis of W(O)(CHMe$_2$Ph)(Me$_2$Pyrr)Py (pyrr=pyrrolide; Py=pyridine)

A 3:1 mixture of W(O)(CHCMe$_2$Ph)Cl$_2$(PPh$_2$Me)$_2$ and W(O)(CHCMe$_2$Ph)Cl$_2$(PPh$_2$Me), (884 mg, 1.175 mmol) was transferred into a 30 mL vial. It was dissolved in benzene (10 mL). LiMe$_2$Pyrr (249 mg, 1.173 mmol) was added as a solid. The pyrrolide residues were rinsed from the vial of the pyrrolide into the reaction mixture with benzene (2 mL in total). Pyridine (104 microL, 1.29 mmol) was added. The reaction mixture was stirred for 3 hours, and then it was analyzed by $^1$H NMR. Complete conversion into the desired product was observed. The reaction mixture was filtered through celite, all volatiles were removed, and the residue was triturated in pentane, resulting in the precipitation of the product. It was isolated by filtration carried out in the freezer. The isolated solid was washed with cold pentane, and then it was dried in N$_2$ stream. Dark yellow solid. Yield: 432 mg (61%).

$^1$H-NMR (C$_6$D$_6$) δ(ppm): 1.60 (s br, 6H, CH$_3$ neophylidene), 2.31 (s br, 12H, CH$_3$ Me$_2$Pyr), 6.12 (br, 2H, C$_{meta}$—H Py), 6.12 (s br, 4H, CH Me$_2$Pyr), 6.57 (br, 1H, C$_{para}$—H Py), 6.73 (m, 3H, neophylidene Ph C$_{meta}$—H, C$_{para}$—H), 6.81 (m, 2H, neophilidene Ph C$_{ortho}$—H), 7.68 (br, 2H, C$_{ortho}$—H Py,), 10.26 (s br, 1H, $^2J_{WH}$=9.2 Hz, W=CH).

$^{13}$C-NMR (C$_6$D$_6$) δ(ppm): 18.1 (CH$_3$ Me$_2$Pyr), 31.5 (CH$_3$ neophylidene), 50.0 (C neophylidene), 110.3 (CH Me$_2$Pyr), 124.4 (C$_{meta}$ Py), 135.2 (NC Me$_2$Pyr), 137.5 (C$_{para}$ Py), 148.7 (neophylidene Ph C$_{ipso}$), 150.2 (C$_{ortho}$ Py), 295.2 (W=CH).

Example 11: Synthesis of W(O)(CHCMe$_2$Ph)(Me$_2$Pyrr)(TPPO)(pyridine)

The W-oxo-bispyrrolide pyridine adduct (99 mg 0.165 mmol) was dissolved in benzene (3 mL). 2,3,5,6-Ph$_4$C$_6$OH (66 mg, 0.165 mmol) was added as a solid. The residues of the phenol were rinsed into the reaction mixture with benzene (2 mL in total). The reaction mixture was stirred at room temperature for 4 hours. $^1$H NMR analysis of the reaction mixture indicated complete conversion into the desired product. The solvent was removed in vacuum. The solid residue was triturated in pentane yielding the product as a yellow solid. It was isolated by filtration, and dried in vacuum induced N$_2$ stream. Pale yellow solid. Yield: 119 mg (80%).

$^1$H-NMR (C$_6$D$_6$) δ(ppm): 1.43 (s, 3H, CH$_3$ neophylidene), 1.69 (s br, 3H, CH$_3$ neophilidene), 2.41 (s br, 6H, CH$_3$Me$_2$Pyr), 6.24 (br, 2H, C$_{meta}$—H Py), 6.44 (s br, 2H, CH Me$_2$Pyr), 6.64 (br, 1H, C$_{para}$—H Py), 6.70-7.45 (m, 25H, neophylidene Ph, tetraphenyl phenolate Ph), 7.13 (s, 1H, C4-H), 8.14 (br, 2H, C$_{ortho}$—H Py,), 10.48 (s br, 1H, W=CH).

$^{13}$C{$^1$H}-NMR (C$_6$D$_6$) δ(ppm): 19.1 (CH$_3$ Me$_2$Pyr) 30.2 (CH$_3$ neophylidene), 31.3 (CH$_3$ neophylidene), 48.6 (C neophylidene), 108.4 (CH Me$_2$Pyr), 123.8 (C$_{meta}$ Py), 125.2 (C4), 130.3 (C2), 135.4 (NC Me$_2$Pyr), 137.4 (C$_{para}$ Py), 141.7 (C3), 150.0 (neophylidene Ph C$_{ipso}$), 150.5 (C$_{ortho}$ Py), 158.0 (C1), 280.4 (W=CH).

Example 12: Synthesis of W(O)(CHCMe$_2$Ph)(Me$_2$Pyrr)(4-Br-TPPO)(pyridine)

The W-oxo-bispyrrolide pyridine adduct (150 mg 0.25 mmol) was dissolved in benzene (3 mL). 4-Br-2,3,5,6-

Ph$_4$C$_6$OH (113 mg, 0.237 mmol) was added as a solid. The residues of the phenol were rinsed into the reaction mixture with benzene (2 mL in total). The reaction mixture was stirred at room temperature for 6 hours. $^1$H NMR analysis indicated complete conversion into the desired product. The solvent was removed in vacuum. The solid residue was triturated in pentane yielding the product as a yellow solid. It was isolated by filtration, and dried in vacuum induced N$_2$ stream. Pale yellow solid. Yield: 205 mg (88%).

$^1$H-NMR (C$_6$D$_6$) δ (ppm): 1.36 (s, 3H, CH$_3$ neophylidene), 1.67 (s br, 3H, CH$_3$ neophylidene), 2.37 (s br, 6H, CH$_3$ Me$_2$Pyr), 6.37 (br, 2H, C$_{meta}$—H Py), 6.43 (s br, 2H, CH Me$_2$Pyr), 6.76 (br, 1H, C$_{para}$—H Py), 6.79-7.25 (m, 25H, neophylidene Ph, tetraphenyl phenolate Ph), 8.18 (br, 2H, C$_{ortho}$—H Py,), 10.26 (s br, 1H, $^2$J$_{WH}$=6.5 Hz, W=CH).

$^{13}$C{$^1$H}-NMR (C$_6$D$_6$) δ(ppm): 19.8 (CH$_3$ Me$_2$Pyr) 30.5 (CH$_3$ neophylidene), 31.8 (CH$_3$ neophylidene), 49.2 (C neophylidene), 108.9 (CH Me$_2$Pyr), 124.5 (C$_{meta}$ Py), 135.6 (NC Me$_2$Pyr), 138.1 (C$_{para}$ Py), 150.1 (neophylidene Ph C$_{ipso}$), 151.2 (C$_{ortho}$ Py), 282.0 (W=CH).

The invention claimed is:
1. A compound of formula I:

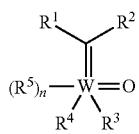

wherein:
each of R$^1$ and R$^2$ is independently —R, —OR, —SR, —N(R)$_2$, —OC(O)R, —S(O)R, —SO$_2$R, —SO$_2$N(R)$_2$, —C(O)N(R)$_2$, —NRC(O)R, or —NRSO$_2$R; wherein each R is independently hydrogen or an optionally substituted group selected from C$_{1-10}$ aliphatic, C$_{1-10}$ heteroalkyl having 1-3 heteroatoms independently selected from nitrogen, oxygen or sulfur, phenyl, a 3-7 membered saturated or partially unsaturated carbocyclic ring, a 6-10 membered bicyclic saturated, partially unsaturated or aryl ring, a 5-6 membered monocyclic heteroaryl ring having 1-4 heteroatoms independently selected from nitrogen, oxygen or sulfur, a 3-7 membered saturated or partially unsaturated heterocyclic ring having 1-3 heteroatoms independently selected from nitrogen, oxygen or sulfur, a 7-10 membered bicyclic saturated or partially unsaturated heterocyclic ring having 1-5 heteroatoms independently selected from nitrogen, oxygen or sulfur, or an 8-10 membered bicyclic heteroaryl ring having 1-5 heteroatoms independently selected from nitrogen, oxygen or sulfur; or
two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen or sulfur;
R$^3$ is optionally substituted 5-14 membered heteroaryl having 1-4 heteroatoms independently selected from nitrogen, oxygen or sulfur, wherein at least one heteroatom is nitrogen; and wherein said heteroaryl ring is coordinated to W via said nitrogen atom;
R$^4$ is —OAr; wherein
Ar is 2,3,5,6-tetraphenylphenyl bearing in 4-position a substituent which is different from hydrogen; or
Ar is 2,3,5,6-tetraphenylphenyl bearing in 4-position a substituent which is different from hydrogen, and wherein one or more of the phenyl substituents in 2, 3, 5, or 6-position is/are substituted;
n is 0, 1 or 2; and
each R$^5$ is independently a phosphorus-containing ligand, wherein the phosphorus-containing ligand is bonded to W through a phosphorus atom,
wherein in Ar the substituent in 4-position is selected from —OR, —SR, —N(R)$_2$, —OC(O)R, —S(O)R, —SO$_2$R, —SO$_2$N(R)$_2$, —C(O)N(R)$_2$, —NRC(O)R, or —NRSO$_2$R; wherein each R is independently an optionally substituted group selected from C$_{1-10}$ aliphatic, C$_{1-10}$ heteroalkyl having 1-3 heteroatoms independently selected from nitrogen, oxygen or sulfur, phenyl, a 3-7 membered saturated or partially unsaturated carbocyclic ring, a 6-10 membered bicyclic saturated, partially unsaturated or aryl ring, a 5-6 membered monocyclic heteroaryl ring having 1-4 heteroatoms independently selected from nitrogen, oxygen or sulfur, a 3-7 membered saturated or partially unsaturated heterocyclic ring having 1-3 heteroatoms independently selected from nitrogen, oxygen or sulfur, a 7-10 membered bicyclic saturated or partially unsaturated heterocyclic ring having 1-5 heteroatoms independently selected from nitrogen, oxygen or sulfur, or an 8-10 membered bicyclic heteroaryl ring having 1-5 heteroatoms independently selected from nitrogen, oxygen or sulfur; or
two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen or sulfur; or
wherein the substituent in 4-position is selected from halogen; nitro; cyano; —NH$_2$; or an ester group C(O)OR$^7$, wherein R$^7$ is C$_{1-10}$ alkyl; or
each R$^5$ is a nitrogen-containing ligand, wherein the nitrogen-containing ligand is bonded to W through a nitrogen atom, and wherein the nitrogen-containing ligand is a pyridine; and
R$^4$ is —OAr; wherein
Ar is 2,3,5,6-tetraphenylphenyl; or
Ar is 2,3,5,6-tetraphenylphenyl, and wherein one or more of the phenyl substituents in 2, 3, 5, or 6-position is/are substituted; or
Ar is 2,3,5,6-tetraphenylphenyl bearing in 4-position a substituent which is different from hydrogen; or
Ar is 2,3,5,6-tetraphenylphenyl bearing in 4-position a substituent which is different from hydrogen, and wherein one or more of the phenyl substituents in 2, 3, 5, or 6-position is/are substituted;
and n is 0, 1 or 2,
wherein in Ar the substituent in 4-position is selected from —OR, —SR, —N(R)$_2$, —OC(O)R, —S(O)R, —SO$_2$R, —SO$_2$N(R)$_2$, —C(O)N(R)$_2$, —NRC(O)R, or —NRSO$_2$R; wherein each R is independently an optionally substituted group selected from C$_{1-10}$ aliphatic, C$_{1-10}$ heteroalkyl having 1-3 heteroatoms independently selected from nitrogen, oxygen or sulfur, phenyl, a 3-7 membered saturated or partially unsaturated carbocyclic ring, a 6-10 membered bicyclic saturated, partially unsaturated or aryl ring, a 5-6 membered monocyclic heteroaryl ring having 1-4 heteroatoms independently selected from nitrogen, oxygen or sulfur, a 3-7 membered saturated or partially unsaturated heterocyclic ring having 1-3 heteroatoms independently selected from nitrogen, oxygen or sulfur, a 7-10 membered bicyclic saturated or partially unsaturated heterocyclic ring having 1-5 heteroatoms independently selected from nitrogen, oxygen or sulfur, or an 8-10 membered bicyclic heteroaryl ring having 1-5 heteroatoms independently selected from nitrogen, oxygen or sulfur; or two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen or sulfur; or wherein the substituent in 4-position is selected from halogen; nitro; cyano; —NH$_2$; or an ester group C(O)OR$^7$, wherein R$^7$ is C$_{1-10}$ alkyl.

2. A compound of formula II:

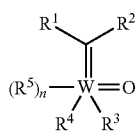

II wherein:

each of R$^1$ and R$^2$ is independently —R, —OR, —SR, —N(R)$_2$, —OC(O)R, —S(O)R, —SO$_2$R, —SO$_2$N(R)$_2$, —C(O)N(R)$_2$, —NRC(O)R, or —NRSO$_2$R; wherein each R is independently hydrogen or an optionally substituted group selected from C$_{1-10}$ aliphatic, C$_{1-10}$ heteroalkyl having 1-3 heteroatoms independently selected from nitrogen, oxygen or sulfur, phenyl, a 3-7 membered saturated or partially unsaturated carbocyclic ring, a 6-10 membered bicyclic saturated, partially unsaturated or aryl ring, a 5-6 membered monocyclic heteroaryl ring having 1-4 heteroatoms independently selected from nitrogen, oxygen or sulfur, a 3-7 membered saturated or partially unsaturated heterocyclic ring having 1-3 heteroatoms independently selected from nitrogen, oxygen or sulfur, a 7-10 membered bicyclic saturated or partially unsaturated heterocyclic ring having 1-5 heteroatoms independently selected from nitrogen, oxygen or sulfur, or an 8-10 membered bicyclic heteroaryl ring having 1-5 heteroatoms independently selected from nitrogen, oxygen or sulfur; or:

two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen or sulfur;

R$^3$ is optionally substituted 5-14 membered heteroaryl having 1-4 heteroatoms independently selected from nitrogen, oxygen or sulfur, wherein at least one heteroatom is nitrogen; and wherein said heteroaryl ring is coordinated to W via said nitrogen atom;

R$^4$ is —OAr; wherein

Ar is 2,3,5,6-tetraphenylphenyl; or

Ar is 2,3,5,6-tetraphenylphenyl, and wherein one or more of the phenyl substituents in 2, 3, 5, or 6-position is/are substituted;

n is 0, 1 or 2; and each R$^5$ is independently a phosphorus-containing ligand, wherein the phosphorus-containing ligand is bonded to W through a phosphorus atom; and wherein a compound of formula

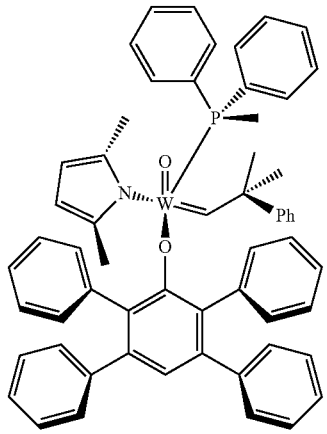

is excluded.

3. The compound of claim 1, wherein
one of R$^1$ and R$^2$ is hydrogen and the other is an optionally substituted group selected from C$_{1-10}$ aliphatic.

4. The compound of claim 1, wherein
one of R$^1$ and R$^2$ is hydrogen and the other is selected from C(CH$_3$)$_3$, C(CH$_3$)$_2$C$_6$H$_5$, or phenyl or phenyl bearing in 2-position a residue —O—R$^6$, wherein R$^6$ is selected from C$_{1-6}$ alkyl.

5. The compound of claim 1, wherein
R$^3$ is selected from optionally substituted pyrrol-1-yl.

6. The compound of claim 1, wherein
R$^3$ is selected from pyrrol-1-yl, 2,5-dimethylpyrrol-1-yl, 2,5-diphenylpyrrol-1-yl and indol-1-yl.

7. The compound of claim 1, wherein
Ar is 2,3,5,6-tetraphenylphenyl bearing in 4-position a substituent selected from a substituent which is electron withdrawing or which is electron donating relative to a substituent which is hydrogen.

8. The compound of claim 1, wherein Ar is 2,3,5,6-tetraphenylphenyl bearing in 4-position a substituent selected from methoxy, ethoxy, n-propoxy, iso-propoxy, n-butoxy, t-butyloxy; NH$_2$, dimethylamino, diethylamino, di(n-propyl)amino, di(iso-propyl)amino; nitro; fluorine, chlorine, bromine or iodine; phenyl, optionally substituted; cyano; C(O)OCH$_3$, C(O)OC$_2$H$_5$ or C(O)OC$_3$H$_7$.

9. The compound of claim 1, wherein Ar is 2,3,5,6-tetraphenylphenyl bearing in 4-position a substituent selected from Br, nitro, cyano, NH$_2$, or N(CH$_3$)$_2$.

10. The compound of claim 1, wherein one or more of the phenyl substituents in 2, 3, 5, or 6 position is/are substituted with one or more substituents, and wherein said substituents are selected from —R, —OR, —SR, —N(R)$_2$, —OC(O)R, —S(O)R, —SO$_2$R, —SO$_2$N(R)$_2$, —C(O)N(R)$_2$, —NRC(O)R, or —NRSO$_2$R; wherein each R is independently an optionally substituted group selected from C$_{1-10}$ aliphatic, C$_{1-10}$ heteroalkyl having 1-3 heteroatoms independently selected from nitrogen, oxygen or sulfur, phenyl, a 3-7 membered saturated or partially unsaturated carbocyclic ring, a 6-10 membered bicyclic saturated, partially unsaturated or aryl ring, a 5-6 membered monocyclic heteroaryl ring having 1-4 heteroatoms independently selected from nitrogen, oxygen or sulfur, a 3-7 membered saturated or partially unsaturated heterocyclic ring having 1-3 heteroatoms independently selected from nitrogen, oxygen or sulfur, a 7-10 membered bicyclic saturated or partially unsaturated heterocyclic ring having 1-5 heteroatoms independently selected from nitrogen, oxygen or sulfur, or an 8-10 membered bicyclic heteroaryl ring having 1-5 heteroatoms independently selected from nitrogen, oxygen or sulfur; or:
- two R groups are optionally taken together with the intervening atoms to form an optionally substituted 3-10 membered, monocyclic or bicyclic, saturated, partially unsaturated, or aryl ring having, in addition to the intervening atoms, 0-4 heteroatoms independently selected from nitrogen, oxygen or sulfur; or
- a substituent selected from halogen; nitro; cyano or an ester group $C(O)OR^6$, wherein $R^6$ is $C_{1-10}$ alkyl.

11. The compound of claim 1, wherein
$R^5$ is selected from $P(CH_3)_3$, $P(CH_3)(C_6H_5)_2$, $P(CH_3)_2(C_6H_5)$, or $P(cyclohexyl)_3$; or
$R^5$ is selected from pyridine or pyridine substituted with one or more substituents selected from $C_{1-6}$ alkyl, $C_{1-6}$ alkoxy, halogen, CN, or phenyl.

12. The compound of claim 1, wherein the compound is selected from

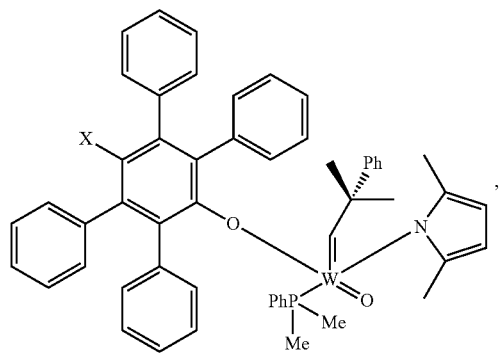

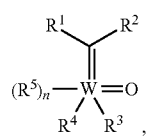, wherein X is an electron-withdrawing substituent selected from Br, $NO_2$, or CN; or
wherein X is an electron-donating substituent selected from $NH_2$, or $N(CH_3)_2$.

13. The compound of claim 2, wherein the compound is

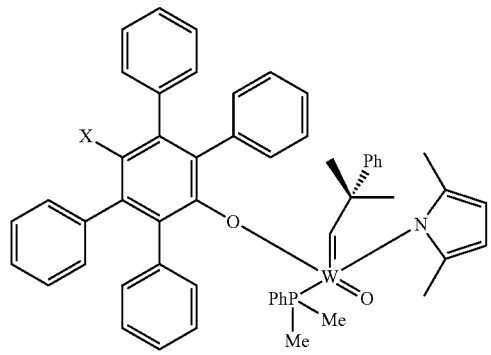

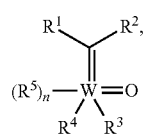

wherein X=H; or
wherein the compound is

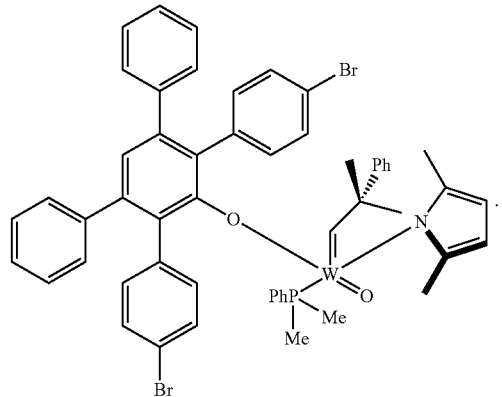

14. A method of making the compound of formula I as defined in claim 1, comprising
reacting a compound of formula (III)

$$(R^5)_n-W=O \quad \text{with } R^1, R^2, R^3, R^4 \quad \text{III}$$

wherein $R^3=R^4$=optionally substituted 5-14 membered heteroaryl having 1-4 heteroatoms independently selected from nitrogen, oxygen or sulfur, wherein at least one heteroatom is nitrogen; and wherein said heteroaryl ring is coordinated to W via said nitrogen atom;
with 2,3,5,6-tetraphenylphenol or a substituted 2,3,5,6-tetraphenylphenol or the phenolate thereof, respectively;
wherein $R^1$, $R^2$, $R^5$ and n and the substituted 2,3,5,6-tetraphenylphenol have the meaning as defined in claim 1.

15. The method of claim 14, further comprising:
reacting a compound of formula (IV)

$$(R^5)_n-W=O \quad \text{with } R^1, R^2, R^3, R^4 \quad \text{IV}$$

wherein $R^1$, $R^2$, $R^5$ and n have the meaning as defined in claim 14;
$R^3=R^4$=halogen;
with an optionally substituted salt of a 5-14 membered heteroaryl having 1-4 heteroatoms independently selected from nitrogen, oxygen or sulfur, wherein at least one heteroatom is a negatively charged nitrogen;
to afford the compound of formula (III).

* * * * *